(12) United States Patent
Nakano et al.

(10) Patent No.: US 9,613,305 B2
(45) Date of Patent: Apr. 4, 2017

(54) PRINTED MATERIAL ON WHICH TWO-DIMENSIONAL CODE IS DISPLAYED

(71) Applicants: TOKYO SHOSEKI CO., LTD., Tokyo (JP); QONCEPT, INC., Tokyo (JP)

(72) Inventors: Kenichi Nakano, Tokyo (JP); Koju Uchida, Tokyo (JP); Takashi Kojima, Tokyo (JP); Tomoyuki Okamoto, Tokyo (JP); Takeru Tohi, Tokyo (JP); Kenichi Hayashi, Tokyo (JP); Yuta Koshizawa, Tokyo (JP)

(73) Assignees: TOKYO SHOSEKI CO., LTD., Tokyo (JP); QONCEPT, INC., Tokyo (JP)

( * ) Notice: Subject to any disclaimer, the term of this patent is extended or adjusted under 35 U.S.C. 154(b) by 0 days.

(21) Appl. No.: 14/654,569

(22) PCT Filed: Apr. 30, 2013

(86) PCT No.: PCT/JP2013/002902
§ 371 (c)(1),
(2) Date: Feb. 18, 2016

(87) PCT Pub. No.: WO2014/064857
PCT Pub. Date: May 1, 2014

(65) Prior Publication Data
US 2016/0155033 A1    Jun. 2, 2016

(30) Foreign Application Priority Data
Oct. 26, 2012  (JP) .................... 2012-236917

(51) Int. Cl.
G06K 19/06    (2006.01)
G06K 7/14    (2006.01)

(52) U.S. Cl.
CPC ..... *G06K 19/06037* (2013.01); *G06K 7/1443* (2013.01); *G06K 7/1456* (2013.01)

(58) Field of Classification Search
CPC   G06K 19/06; G06K 7/14; G06K 7/10; G06K 9/18; G06K 9/36; G06K 9/80; G06F 17/00
(Continued)

(56) References Cited
U.S. PATENT DOCUMENTS

| | | | |
|---|---|---|---|
| 5,943,448 A * | 8/1999 | Tatsuta | G06K 7/10851 382/270 |
| 2002/0169892 A1* | 11/2002 | Miyaoku | G06Q 30/0239 709/246 |

(Continued)

*Primary Examiner* — Edwyn Labaze
(74) *Attorney, Agent, or Firm* — Oliff PLC

(57) ABSTRACT

The invention is a printed material on which a two-dimensional code that can be read by a terminal and from which information for specifying contents reproduced by terminal can be acquired is displayed. Two-dimensional code displays a frame portion from which information about position and attitude of terminal can be acquired by terminal and a code portion configured by rotational state display dots 151, 152, 153, and 154 and 20 dots specifying contents to be reproduced by terminal. The 20 dots of the code portion and rotational state display dots are arranged on upper and lower dot portions sandwiching a dot nondisplay portion displaying a character, pictorial symbol, and the like. Rotational state display dots 151, 152, 153, and 154 show rotational position state of the terminal with respect to the two-dimensional code, and displays pattern information.

6 Claims, 6 Drawing Sheets

(58) Field of Classification Search
USPC .................. 235/494, 454, 375, 462.09, 462.1
See application file for complete search history.

(56) References Cited

U.S. PATENT DOCUMENTS

| | | | |
|---|---|---|---|
| 2008/0095440 A1* | 4/2008 | Onishi ..................... | G06K 9/22 382/181 |
| 2009/0242650 A1* | 10/2009 | Ushijima ......... | G06K 19/06037 235/494 |
| 2012/0325901 A1* | 12/2012 | Ross ................. | G06F 17/30879 235/375 |
| 2013/0317901 A1* | 11/2013 | Wang ..................... | G06Q 30/02 705/14.41 |

* cited by examiner

Fig.4
(a) 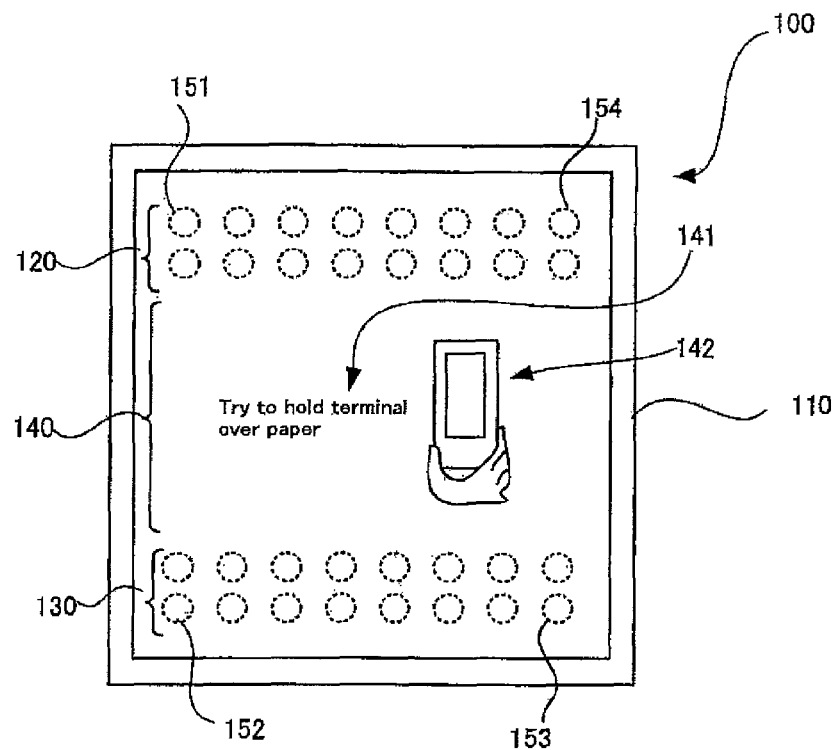
(b) 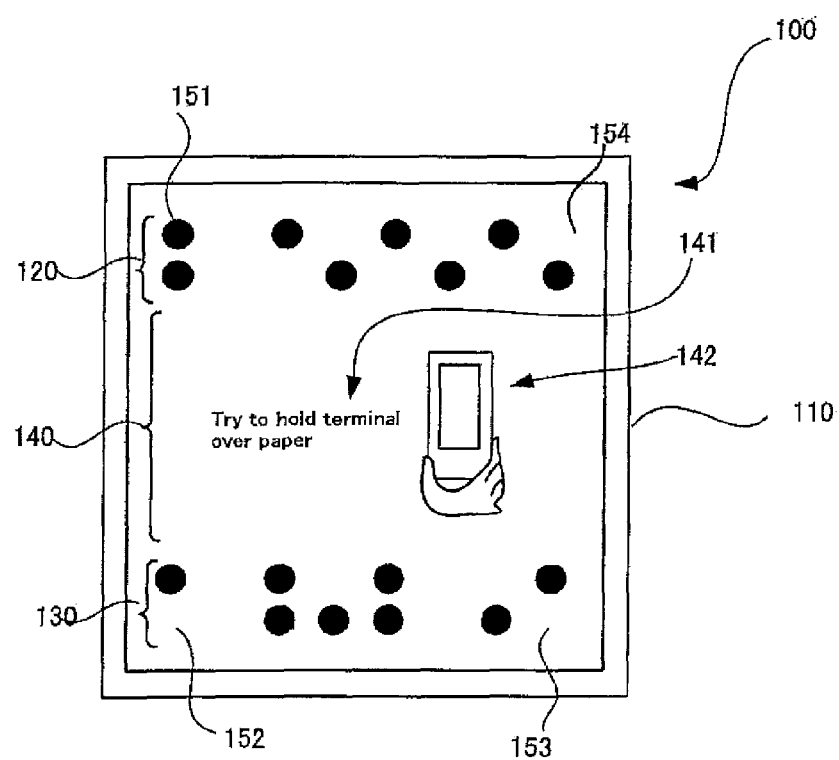

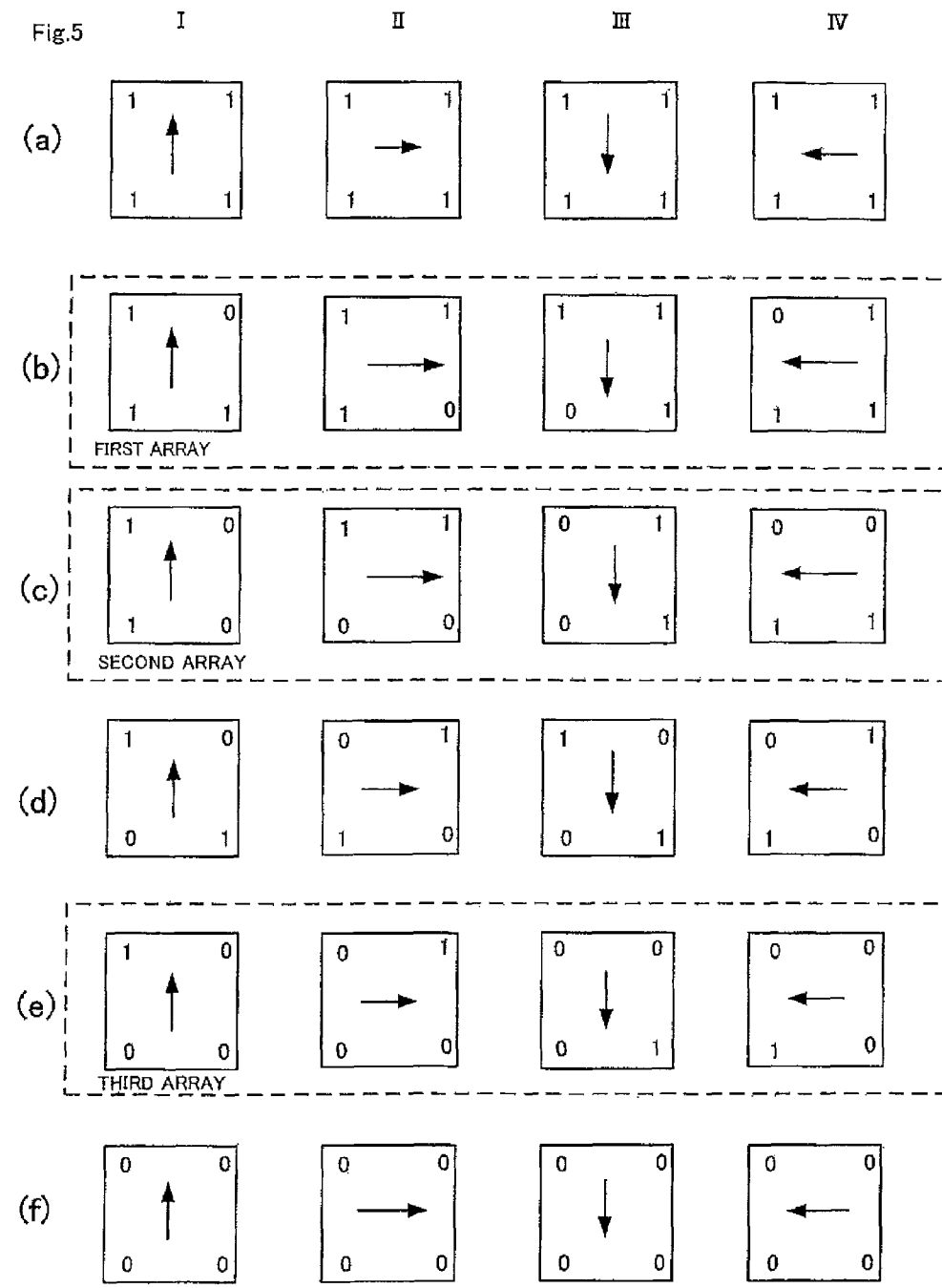

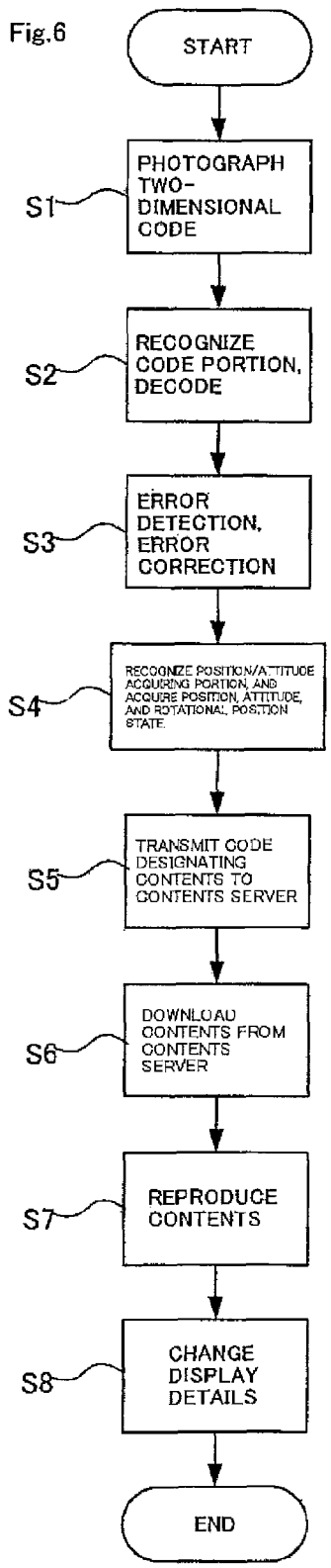

PRINTED MATERIAL ON WHICH TWO-DIMENSIONAL CODE IS DISPLAYED

TECHNICAL FIELD

The present invention relates to a printed material on which a two-dimensional code for designating contents reproduced by a mobile terminal is displayed.

BACKGROUND ART

In the past, a technique that reads a two-dimensional code displayed on a printed material such as a book by a mobile terminal and receives contents corresponding to the read two-dimensional code from a server to reproduce the contents has been proposed.

Patent literature 1 describes a moving image distribution system that includes a mobile wireless communication device that reproduces moving image data and a server to which the mobile wireless communication device can be connected through a network, the mobile wireless communication device reading a two-dimensional code from a book on which a two-dimensional code corresponding to moving image data to be reproduced is put, transmitting a distribution request of the moving image data corresponding to the read two-dimensional code to the server, and reproducing the moving image data distributed from the server.

Patent Literature 1: Japanese Unexamined Patent Publication No. 2009-105591

DISCLOSURE OF THE INVENTION

Problem to be Solved by the Invention

As contents such as a moving image, an image, sound read as described above and displayed on a terminal, the states of the displayed contents are demanded to be shifted or changed depending on positions or attitudes of a reading terminal for a printed material such as a book.

However, the two-dimensional code described in Patent Literature 1 and displayed on a book is a QR code (registered trademark), Data Matrix, PDF417, or the like to have a problem in which information about the position or the attitude of a reading terminal with respect to the book cannot be obtained from the code.

The present invention has been made in consideration of the above problem, has as its object to provide a book that displays a two-dimensional code from which information about the position and the attitude of a terminal that reads a two-dimensional code with respect to a printed material on which the two-dimensional code is displayed.

Means for Solving the Problem

An invention according to claim 1 that solves the problem is a printed material on which a two-dimensional code that can be read by a terminal and from which information for specifying contents to be reproduced by the terminal can be acquired is displayed, wherein the two-dimensional code displays a position/attitude acquiring portion from which information about a position and an attitude of the terminal with respect to the two-dimensional code through the terminal and a code portion that specifies contents to be reproduced by the terminal, According to the present invention, since the information about the attitude and the position of the terminal with respect to the printed material can be acquired, the acquired contents can be changed or altered depending on the attitude and the position of the terminal with respect to the printed material and then displayed.

An invention described in claim 2 is a printed material on which the two-dimensional code described in claim 1 is displayed, wherein the position/attitude acquiring portion includes a frame portion arranged around the two-dimensional code and four rotational state display dots that can display pieces of 1-bit information representing rotational states of the terminal with respect to the two-dimensional code, respectively, the code portion includes a plurality of code display dots that can display each of the pieces of 1-bit information, and the rotational state display dots and the code display dots are displayed on both side portions sandwiching a dot nondisplay portion on which no dot is displayed in the frame portion.

According to the present invention, a character, a graphic, or the like can be displayed on the dot nondisplay portion of the two-dimensional code.

A present invention according to claim 3 is a printed material on which the two-dimensional code according to claim 2 is displayed, wherein the frame portion is square, and the rotational state display dots are displayed at four corners of the frame portion.

According to the present invention, the position and the attitude of the terminal with respect to the printed material can be acquired from a change in shape of the frame portion the image of which is picked and a display of the rotational state display dots.

An invention according to claim 4 is a printed material on which the two-dimensional code described in any one of claims 1 to 3 is displayed, wherein the code portion includes dots for error detection and error correction.

According to the present invention, an error of a code display can be detected and corrected, and correct code recognition can be achieved.

An invention described in claim 5 is a printed material on which the two-dimensional code described in any one of claims 1 to 4 is displayed, wherein the contents include at least one of an image, a moving image, and sound.

According to the present invention, the image, the moving image, and the sound designated by a two-dimensional code the image of which is picked by the terminal can be reproduced by the terminal.

An invention described in claim 6 is a printed material on which the two-dimensional code described in any one of claims 2 to 5 is displayed, wherein the rotational state display dots include four dots that represent pieces of 1-bit information displaying "0" or "1" and are arranged in any one of the following states, a first array: a state in which "0" is displayed at one corner, and "1" are displayed at the other corners, a second array: a state in which "0" are displayed at two adjacent corners, and "1" are displayed at other two corners, and a third array: a state in which "1" is displayed at one corner, and "0" are displayed at the other corners, an array state of the rotational state display dots in the first array, the second array, and the third array read in a specific positional relationship between the two-dimensional code determined in advance and the terminal is compared with an array state of the rotational state display dots of the two-dimensional code recognized by the terminal to make it possible to recognize an attitude of the terminal with respect to the two-dimensional code, and any one of the first array, the second array, and the third array that is selected as the acquired rotational state display dots is determined to make it possible to recognize pieces of 3 pattern information as information except for the attitude of the two-dimensional code.

According to the present invention, the display of the rotational state display dots makes it possible to display an attitude of the terminal with respect to the printed material, and 3 pattern states except for the information representing the attitude of the terminal with respect to the printed material can be displayed by displaying any one of the first array, the second array, and the third array. For this reason, the number of pieces of information that can be displayed in a two-dimensional code can be increased.

An invention described in claim 7 is a printed material on which the two-dimensional code described in any one of claims 1 to 6 is displayed, wherein the printed material is a book, and the two-dimensional code causes the terminal to reproduce contents related to details displayed on a page space on which the two-dimensional code is displayed.

According to the present invention, contents corresponding to page spaces of a book can be reproduced.

Effect of the Invention

According to the present invention, since a two-dimensional code is read by a terminal to make it possible to acquire information related to an attitude and a position of the terminal with respect to a printed material, contents displayed by the terminal can be changed or altered depending on the attitude of the terminal.

BRIEF DESCRIPTION OF THE DRAWINGS

FIG. 4 shows a two-dimensional code displayed on a book shown in FIG. 1, FIG. 4A is a pattern diagram showing an arrangement state, and FIG. 4B is a pattern diagram showing an example of a display.

FIG. 5 is a pattern diagram for explaining attitude recognition with rotational state display dots of a two-dimensional code.

FIG. 6 is a flow chart showing a flow of processes.

BEST MODE FOR CARRYING OUT THE INVENTION

A printed material on which a two-dimensional code according to a mode (to be referred to as an embodiment hereinafter) for carrying out the present invention is displayed will be described below. In an example according the following embodiment, an explanation will be made by using a book as a printed material. However, as the printed material, the present invention can be applied to any printed material such as a magazine, a brochure, a leaflet, or a calendar.

Figure 1:
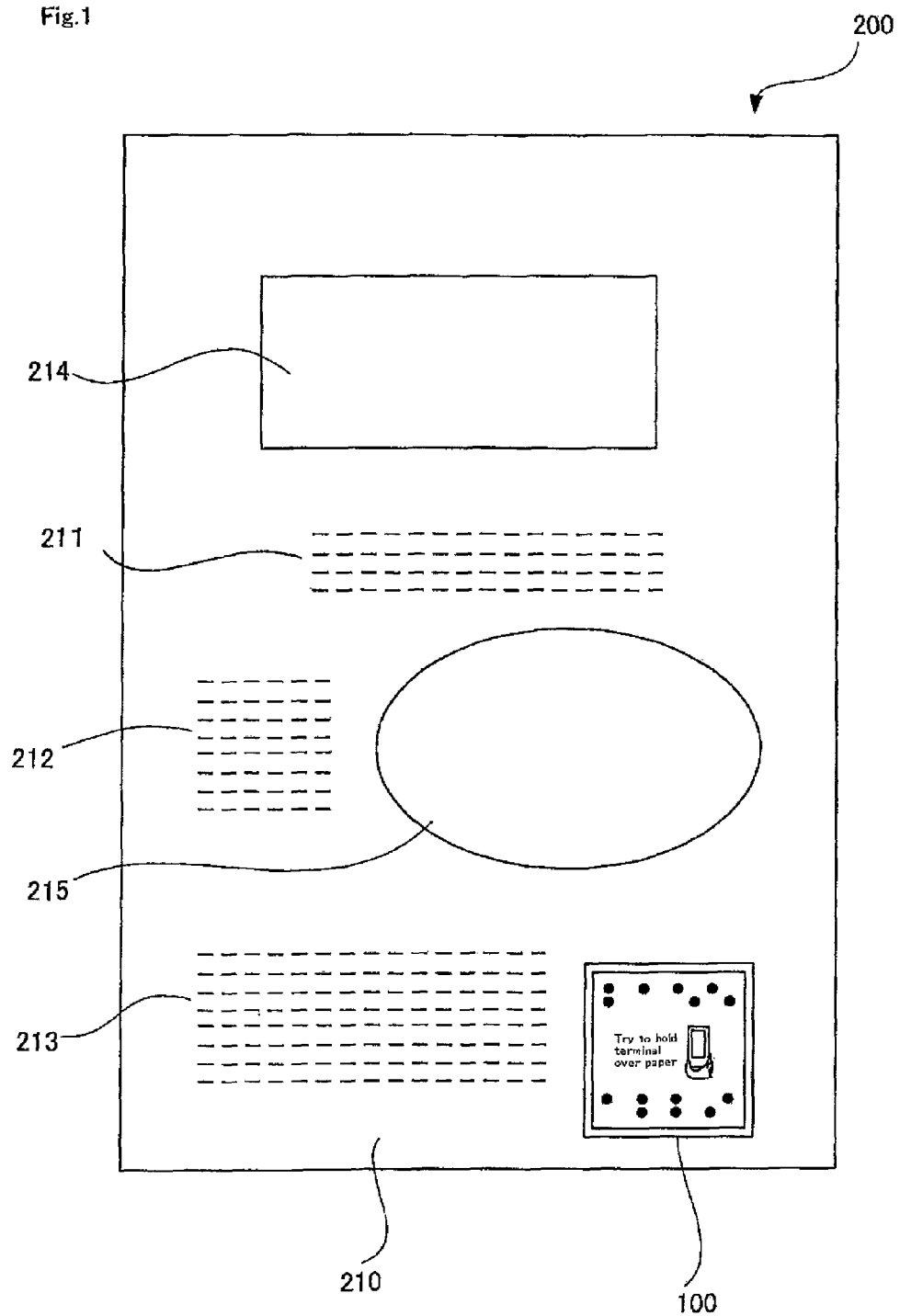
FIG. 1 is a pattern block diagram showing a printed material on which a two-dimensional code according to an embodiment of the present invention is displayed.

A basic flow that causes a terminal to reproduce contents by using a printed material on which a two-dimensional code according to the embodiment is displayed will be described below. FIG. 1 is a pattern diagram showing a printed material on which a two-dimensional code according to the embodiment of the present invention is displayed, FIG. 2 is a pattern diagram showing a two-dimensional code image-pickup state on the terminal, and FIG. 3 is a pattern diagram showing a contents reproducing state on the terminal.

As shown in FIG. 1, in a page space 210 on a predetermined page of a book 200 according to Embodiment 1, in addition to texts 211, 212, and 213 and pictorial cuts 214 and 215, a two-dimensional code 100 is displayed. Similarly, the two-dimensional code can be displayed in page spaces on other pages, a front cover, and a back cover. The number of two-dimensional codes 100 to be displayed is not limited to one on one page, and two or more two-dimensional codes 100 can be displayed. The contents of the book 200 can be recognized by only the texts 211, 212, and 213 and the pictorial cuts 214 and 215.

Figure 2:
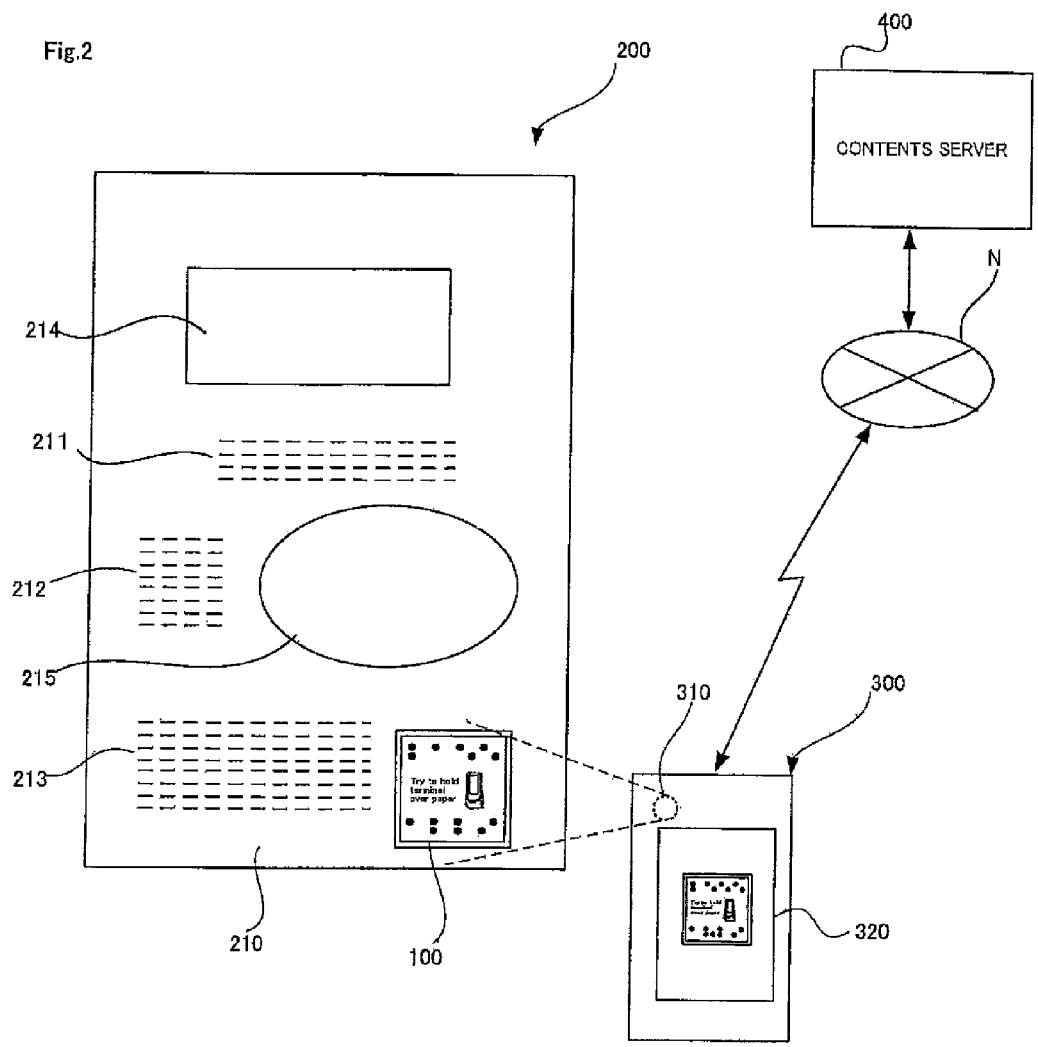
FIG. 2 is a pattern diagram showing a two-dimensional code image-pickup state on the terminal.
Figure 3:
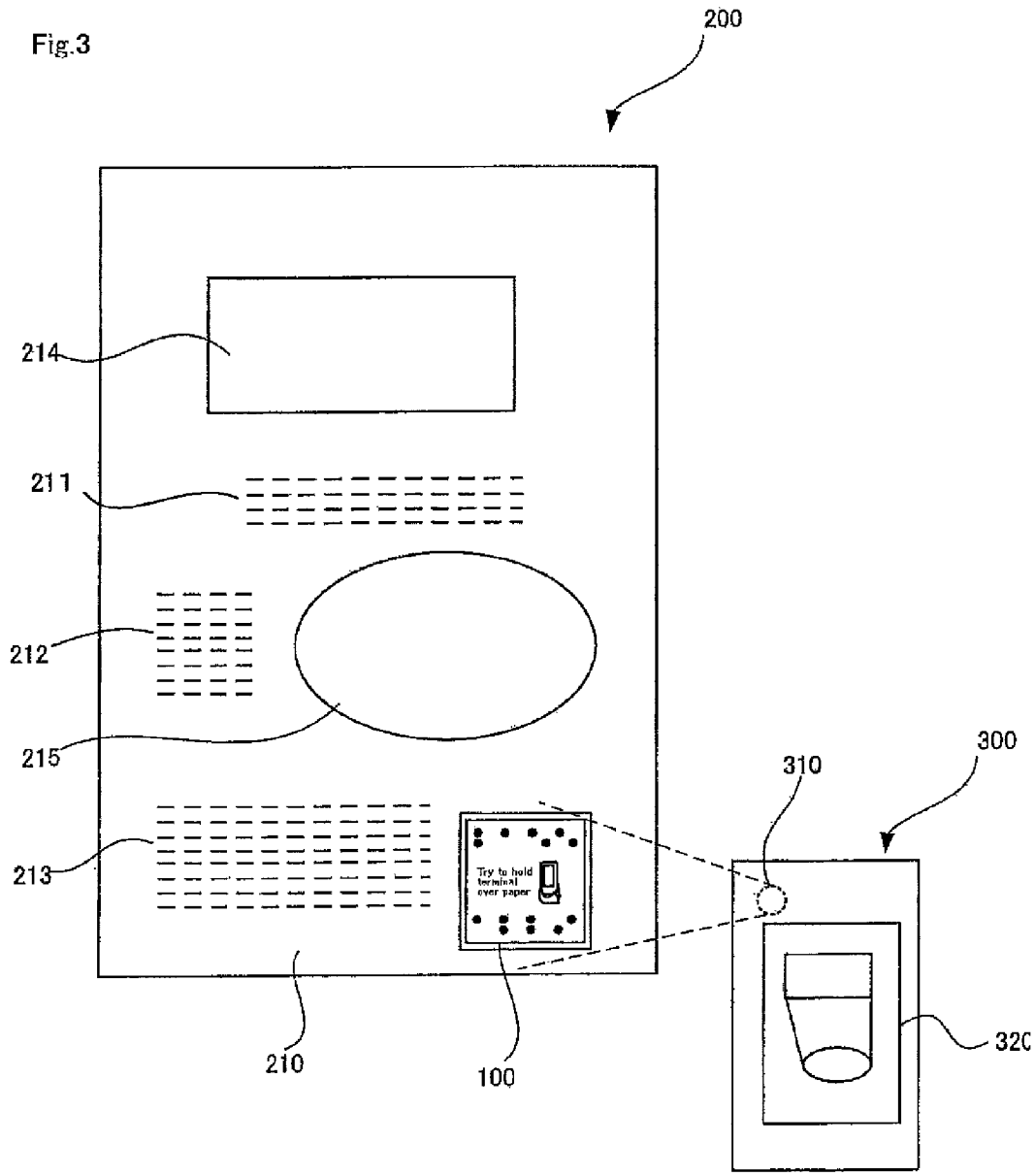
FIG. 3 is a pattern diagram showing a contents reproducing state on the terminal.

As shown in FIG. 2, on the book 200, a terminal 300, for example, a mobile phone, a smart phone, a tablet computer, or the like photographs the two-dimensional code 100, downloads the contents designated by the two-dimensional code 100 from a contents server 400 connected to the terminal through the Internet N, and reproduces the contents on a display unit 320. Application software that recognizes the two-dimensional code 100 to acquire and reproduce the contents is installed prior to the processes.

The terminal 300 includes, in addition to an image-pickup device 310 and the display unit 320, a decoding process unit that decodes a code that specifies contents downloaded from image data of the two-dimensional code 100 the image of which is picked, a positional relationship acquiring unit that acquires a positional relationship between the two-dimensional code 100 and the terminal 300, a communication process unit that performs a communication process with the contents server 400, and the like. The units are produced such that a CPU (Central Processing Unit) included in the terminal 300 executes application software. In the contents server 400, a large number of contents corresponding to the two-dimensional code 100 displayed on the book 200 are prepared, the contents specified by the two-dimensional code 100 are transmitted to the terminal 300.

The contents can include an image, a moving image, sound, and the like. For example, as shown in FIG. 3, a change from a state shown by the pictorial cut 214 to a state shown by pictorial cut 215 can be displayed together with an explanation made by the moving image and the sound. The state change from the pictorial cut 214 to the pictorial cut 215 can be changed by an operation of a touch panel (not shown) arranged on the display unit 320. The details of the contents are not limited to the above description, and can be changed as needed.

The display details of the contents can be changed depending on the positions and the attitudes of the page space 210 of the book 200 and the terminal 300. For example, when the terminal is moved and obliquely rotated with respect to the page space 210, the reproduction/display details of the contents can be changed depending on movement, obliquity, and rotation of the terminal 300. A change in attitude of the terminal 300 can also be acquired from a magnetic sensor, an acceleration sensor, or the like included in the terminal 300.

The two-dimensional code 100 will be described below. FIG. 4 shows a two-dimensional code displayed on the book shown in FIG. 1, FIG. 4A is a pattern diagram showing an arrangement state, and FIG. 4B is a pattern diagram showing an example of a display. The two-dimensional code 100 includes a white square frame portion 110 arranged on the circumference, an upper dot portion 120 configured by 16 dots arranged on an upper side of the inside of the frame portion 110, a lower dot portion 130 configured by 16 dots arranged on a lower side of the inside, and a dot nondisplay portion 140 formed between the upper dot portion 120 and the lower dot portion 130. The shape of the frame portion 110 is not limited to a square, and a rectangle, a circle, or the other shapes can be employed. The color is not limited to white when the color can be recognized on the page space. Another color may be employed.

On the dot nondisplay portion 140, additional information that can be recognized with the naked eye can be displayed. In the example, characters "kazashitemiyou" (Try to hold terminal over paper) 141 and a pictorial symbol 142 representing a state in which a terminal is held up.

As the two-dimensional code 100, maximum of 32 dots can be displayed. The dots are displayed in white or black, and show 1-bit information "0" or "1". In the embodiment, four dots arranged at four corners of the frame portion 110 are defined as rotational state display dots 151, 152, 153, and 154.

The remaining 28 dots are used as code display dots, 8 dots of the 28 dots are used as dots for error detection and error correction. As a scheme for the error detection and the error correction, a known error correction scheme can be used. Therefore, the code display portion can specify contents of 2^20=1048576 types. The number of dots of the code display portion can be changed as needed. For example, 28 or more dots can be used.

When the two-dimensional code 100 described above is actually used, as shown in FIG. 4B, predetermined dots are shown as black dots, and the other dots are shown as white dots. In this manner, necessary information can be displayed. The dots can be displayed such that white and black are inverted. In addition to the white and black dots, dark and bright dots or color dots that can be discriminated when the image of the dots is picked up are used to display information. In the illustrated example, a background color is white. However, as the background color, another color such as black can be used.

In the terminal 300, the frame portion 110 is extracted from image data of the book 200 obtained by image picking up. Information such as a position and an inclination of the terminal 300 with respect to the two-dimensional code 100 can be obtained from the dimensions of the sides of the frame portion 110 and the arrangement states of the rotational state display dots 151, 152, 153, and 154.

More specifically, the acquired image data of the frame portion 110 is analyzed to calculate ratios of the lengths of the sides. From the ratios, the position and the attitude of the terminal 300 with respect to the two-dimensional code 100 are acquired. The calculation is performed by a known method. From the display of the rotational state display dots 151, 152, 153, and 154, a rotational position relationship between the two-dimensional code 100 and the terminal 300 is acquired. In the embodiment, a rotational position relationship between the two-dimensional code 100 and the terminal 300 is acquired by the following method.

FIG. 5 is a pattern diagram for explaining attitude recognition with rotational state display dots of a two-dimensional code. Since an attitude relationship between the two-dimensional code 100 and the terminal 300 is relative, an explanation will be made on the assumption that the two-dimensional code 100 rotates.

As the rotational state display dots 151, 152, 153, and 154, four dots are displayed in "white" or "block". In this display, the dots express "0" or "1". In this case, it is assumed that, as display states of the four dots, arrays of the dots at the four corners are sequentially written in a counterclockwise direction from "upper left", i.e., in the order given by "upper left", "lower left", "lower right", and "upper right". More specifically, the rotational state display dot 151, the rotational state display dot 152, the rotational state display dot 153, and the rotational state display dot 154 are written in the order named.

The arrays of the rotational state display dots 151, 152, 153, and 154 of the two-dimensional code 100 have the following 6 combinations (a) to (f) in consideration of the coincidence by rotation:

(a) 1, 1, 1, 1
(b) 1, 1, 1, 0
(c) 1, 1, 0, 0
(d) 1, 0, 1, 0
(e) 1, 0, 0, 0
(d) 0, 0, 0, 0

In this case, as shown in FIG. 5, since (a), (d), and (f) are symmetrical about a point, rotation of the two-dimensional code 100 cannot be detected. More specifically, in (a) and (f), all rotational states I, II, III, and IV cannot be discriminated from each other. In (d), I and III cannot be discriminated from each other, and II and IV cannot be discriminated from each other. In this case, I, II, III, and IV show a state in which the two-dimensional code 100 is sequentially rotated by 90° in a clockwise direction.

The states I, II, III, and IV can be discriminated by (b), (c), and (e). Thus, it is assumed that (b) is a first array: a state in which "0" is displayed at one corner, and "1" are displayed at the other corners, (c) is a second array: a state in which "0" are displayed at two adjacent corners, and "1" are displayed at the other two corners, and (e) is a third array: a state in which "1" is displayed at one corner, and "0" are displayed at the other corners.

When the two-dimensional code 100 and the terminal 300 are set in a predetermined rotational position state, all array states of the rotational state display dots in the first array, the second array, and the third array displayed in the two-dimensional code 100 are defined as the state I. The display state is compared with the display state of the rotational state display dots 151, 152, 153, and 154 recognized by the terminal 300. In this manner, an attitude of the terminal 300 with respect to the two-dimensional code 100 can be recognized.

Furthermore, any one of the first array, the second array, and the third array that is selected as an array of the displayed rotational state display dots is determined to make it possible to recognize pieces of 3 pattern information except for information representing the position and the attitude of the terminal 300 in the two-dimensional code 100. In other words, in the embodiment, information of log 3/log 2=1.5849625 . . . bits can be added.

At this time, 3 dots of the four dots are used to display a rotational position relationship, and the other dot can also express information. In this case, 2 patterns, i.e., "0" or "1", that is, 1-bit information can be added. Information having bits the number of which is larger by 0.5849625 . . . bits than that in a method that discriminates rotational position relationship by 3 bits can be obtained in the method according to the embodiment.

A flow from reading of a two-dimensional code to reproduction of contents will be described below. When the terminal 300 picks up an image of the two-dimensional code 100 (step S1), the two-dimensional code 100 is extracted from image data obtained by image picking up, and 20 dots of a code portion are decoded to acquire a code for designating the contents (step S2). At this time, error detection and error correction are performed by 4 bits as needed (step S3).

States of the position and the attitude of the terminal 300 with respect to the two-dimensional code 100 are acquired from the image data of the frame portion 110, and a rotational position state of the terminal 300 with respect to the two-dimensional code 100 is acquired from the rotational state display dots 151, 152, 153, and 154 (step S4).

A code for designating the contents is transmitted to the contents server 400 (step S5), the contents are downloaded from the contents server 400 to the terminal 300 (step S6), and the contents are reproduced by the terminal 300 (step S7). In reproduction of the contents, on the basis of the position, the attitude, and the rotational position state that are acquired in step S4, reproduction states of the contents can be changed (step S8).

As described above, according to a printed material on which a two-dimensional code according to the embodiment is displayed, information related to an attitude and a position of a terminal with respect to the printed material can be acquired. For this reason, acquired contents can be displayed such that the contents are changed or altered depending on the attitude and the position of the terminal with respect to the printed material.

According to the embodiment, characters, graphics, and the like can be displayed on a dot nondisplay portion of the two-dimensional code, and, in addition to rotational position information, pieces of 3 pattern information can be displayed by rotational state display dots.

REFERENCE NUMERALS

100: two-dimensional code
110: frame portion (position/attitude acquiring portion)
120: upper dot portion
130: lower dot portion
140: dot nondisplay portion
141: character
142: pictorial symbol
151, 152, 153, 154: rotational state display dots (position/attitude acquiring portion)
200: book
210: page space
211, 212, 213: text
214, 215: pictorial cut
300: terminal
310: image-pickup device
320: display unit
400: contents server

The invention claimed is:

1. A printed material on which a two-dimensional code is displayed and on which the two-dimensional code that can be read by a terminal and from which information for specifying contents to be reproduced by the terminal can be acquired is displayed,
   wherein the two-dimensional code includes:
      a position/attitude acquiring portion from which information about a position and an attitude of the terminal with respect to the two-dimensional code through the terminal is acquired, and
      a code portion that specifies contents to be reproduced by the terminal, and wherein:
      the position/attitude acquiring portion includes a frame portion arranged around the two-dimensional code and four rotational state display dots that can display pieces of 1-bit information representing rotational states of the terminal with respect to the two-dimensional code, respectively,
      the code portion includes a plurality of code display dots that can display each of the pieces of 1-bit information, and
      the rotational state display dots and the code display dots are displayed on both side portions sandwiching a dot nondisplay portion on which no dot is displayed in the frame portion.

2. The printed material on which a two-dimensional code is displayed according to claim 1, wherein the frame portion is square, and the rotational state display dots are displayed at four corners of the frame portion.

3. The printed material on which a two-dimensional code is displayed according to claim 1, wherein the code portion includes dots for error detection and error correction.

4. The printed material on which a two-dimensional code is displayed according to claim 1, wherein the contents include at least one of an image, a moving image, and sound.

5. The printed material on which a two-dimensional code is displayed according to claim 1 is displayed, wherein:
   the rotational state display dots include four dots that represent pieces of 1-bit information displaying "0" or "1" and are arranged in any one of the following states,
   a first array: a state in which "0" is displayed at one corner, and "1" are displayed at the other corners,
   a second array: a state in which "0" are displayed at two adjacent corners, and "1" are displayed at other two corners, and
   a third array: a state in which "1" is displayed at one corner, and "0" are displayed at the other corners,
   an array state of the rotational state display dots in the first array, the second array, and the third array read in a specific positional relationship between the two-dimensional code determined in advance and the terminal is compared with an array state of the rotational state display dots of the two-dimensional code recognized by the terminal to make it possible to recognize an attitude of the terminal with respect to the two-dimensional code, and
   any one of the first array, the second array, and the third array that is selected as the acquired rotational state display dots is determined to make it possible to recognize pieces of 3 pattern information as information except for the attitude of the two-dimensional code.

6. The printed material on which a two-dimensional code is displayed according to claim 1, wherein the printed material is a book, and the two-dimensional code causes the terminal to reproduce contents related to details displayed on a page space on which the two-dimensional code is displayed.

* * * * *